US 8,089,952 B2

(12) United States Patent
Spade et al.

(10) Patent No.: US 8,089,952 B2
(45) Date of Patent: Jan. 3, 2012

(54) INTELLIGENT CALL ROUTING

(75) Inventors: John Spade, Pompano Beach, FL (US);
Haydar Haba, Burlingame, CA (US);
Sam Raman, Henderson, NV (US)

(73) Assignee: IntelePeer, Inc., San Mateo, CA (US)

( * ) Notice: Subject to any disclaimer, the term of this patent is extended or adjusted under 35 U.S.C. 154(b) by 571 days.

(21) Appl. No.: 11/849,044

(22) Filed: Aug. 31, 2007

(65) Prior Publication Data
US 2009/0059918 A1 Mar. 5, 2009

(51) Int. Cl.
*H04L 12/28* (2006.01)
(52) U.S. Cl. ........................................................ 370/351
(58) Field of Classification Search .................. None
See application file for complete search history.

(56) References Cited

U.S. PATENT DOCUMENTS

| 5,311,585 | A  | * | 5/1994  | Armstrong et al. ...... 379/221.02 |
| 5,675,583 | A  | * | 10/1997 | Bales et al. ................ 370/261 |
| 6,349,137 | B1 | * | 2/2002  | Hunt et al. .............. 379/265.06 |
| 6,415,027 | B1 |   | 7/2002  | Malik |
| 7,190,676 | B2 | * | 3/2007  | Anderson, Sr. ............. 370/236 |
| 2002/0061008 | A1 | * | 5/2002  | Lysejko et al. ............. 370/351 |
| 2002/0181457 | A1 | * | 12/2002 | Mezeul et al. ............. 370/389 |
| 2004/0001439 | A1 | * | 1/2004  | Jones ........................ 370/235 |
| 2004/0052260 | A1 |   | 3/2004  | Tabu |
| 2004/0248564 | A1 | * | 12/2004 | Moore et al. ............... 455/417 |
| 2005/0025105 | A1 | * | 2/2005  | Rue ............................ 370/338 |
| 2005/0063379 | A1 | * | 3/2005  | Wybenga et al. .......... 370/389 |
| 2005/0169266 | A1 | * | 8/2005  | Aggarwal et al. .......... 370/389 |
| 2006/0159088 | A1 | * | 7/2006  | Aghvami et al. .......... 370/389 |
| 2006/0193318 | A1 | * | 8/2006  | Narasimhan et al. ...... 370/389 |
| 2006/0245350 | A1 | * | 11/2006 | Shei et al. .................. 370/216 |
| 2007/0133419 | A1 | * | 6/2007  | Segel ........................ 370/236 |
| 2007/0159963 | A1 | * | 7/2007  | Qing et al. ................. 370/389 |
| 2008/0062996 | A1 | * | 3/2008  | Kaippallimalil et al. .. 370/395.1 |
| 2008/0137832 | A1 | * | 6/2008  | Heinze et al. ........... 379/220.01 |
| 2009/0316695 | A1 | * | 12/2009 | Li et al. ..................... 370/389 |

OTHER PUBLICATIONS

International Search Report corresponding to International Application No. PCT/US2008/074619, dated Jan. 16, 2009, 3 pages.

* cited by examiner

*Primary Examiner* — Chirag Shah
*Assistant Examiner* — Amar Persaud
(74) *Attorney, Agent, or Firm* — DLA Piper LLP (US)

(57) ABSTRACT

A call routing decision for connecting a call between source and target devices is based on the traffic type (e.g., facsimile, modem, voice). In some implementations, the traffic type is determined and stored (e.g., in a billing record). The traffic type can be used to connect, block or reroute subsequent calls of the same traffic type.

27 Claims, 4 Drawing Sheets

INTELLIGENT CALL ROUTING

TECHNICAL FIELD

The subject matter of this application is generally related to telecommunications.

BACKGROUND

The support of sending faxes over voice over IP (VoIP) is limited. Conventional voice codecs are not designed for facsimile (FAX) transmission. One solution to overcome the drawback is to treat the fax system as a message switching system which does not need real time data transmission. In such a system, a FAX is sent as an email attachment or remote printout using Internet Printing Protocol. The receiving device can buffer the incoming FAX data before displaying or printing the FAX image.

Another solution to transmitting FAX over VoIP is addressed in ITU-T Recommendation T.38. T.38 describes technical features for transferring facsimile documents in real-time between two standard Group 3 FAX terminals over the Internet or other networks using Internet Protocol (IP). The Recommendation allows the use of either Transmission Control Protocol (TCP) or User Datagram Protocol (UDP) depending on the service environment. T.38 enabled devices enable use of ordinary FAX machines on modern networks, permitting Analog Telephone Adapters (ATAs) or other FAX over IP (FoIP) products to handle FAX calls through a VoIP service.

Unfortunately, T.38 usage and capability varies greatly between VoIP service providers. Some VoIP service providers do not support T.38 at all while other VoIP service providers support T.38 only partially. Despite a decline in conventional FAX due to Internet and e-mail FAX, the industry trend is to transparently support FAX using T.38.

Accordingly, there is a need to determine traffic routes within a communication network for providing a high quality of service (QoS) for certain traffic types.

SUMMARY

A call routing decision for connecting a call between source and target devices is based on the traffic type (e.g., facsimile, modem, voice). In some implementations, the traffic type is determined and stored (e.g., in a billing record). The traffic type can be used to connect, block or reroute subsequent calls of the same traffic type.

In some implementations, a method includes: receiving traffic from a first device for transmission to a second device at least partially through a packet-switched data network; determining a traffic type; determining a route to the second device based on the traffic type; and transmitting the traffic to the second device based on the route.

Other implementations are disclosed, including implementations directed to systems, methods, apparatuses and computer-readable mediums.

DETAILED DESCRIPTION

Example Intelligent Routing System

Figure 1:
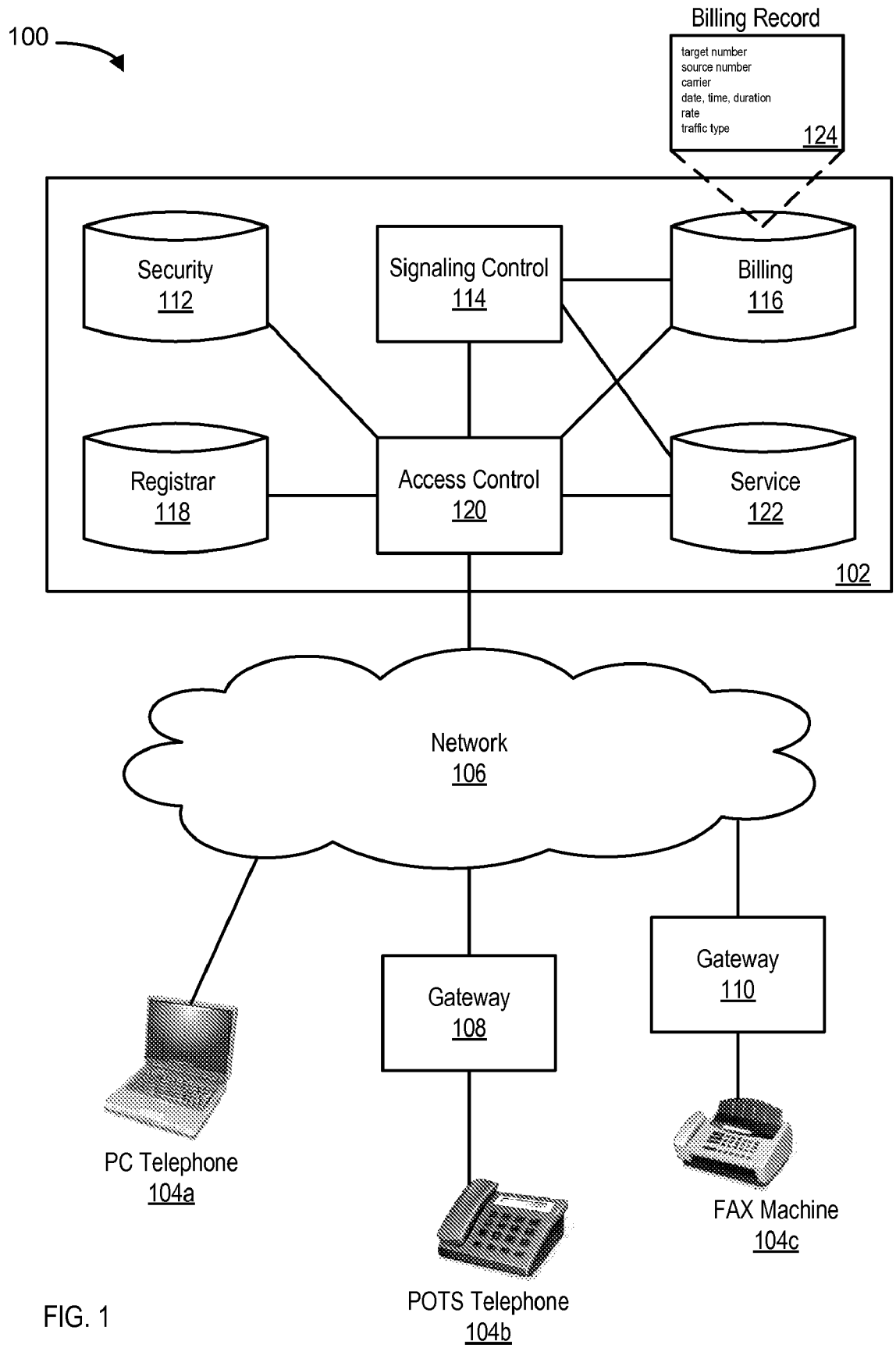
FIG. 1 is a block diagram of an example network for intelligently routing voice and data traffic between source and target devices based on traffic type.

FIG. 1 is a block diagram of an example network 100, such as a Media Peering Grid™, for example, for intelligently routing voice and data traffic between a calling device and a called device based on traffic type. In some implementations, the system 100 includes a traffic routing management system 102, communication devices 104 and network 106.

The network 106 can include various forms of communication networks and equipment, including but not limited to: switches, routers, hubs, repeaters, bridges, servers, etc. The network 106 can include packet-switched data networks (e.g., the Internet, intranets, extranets, subnets), the public switched telephone network (PSTN), wireless networks, local area networks (LANs), wide area networks (WANs), peer-to-peer networks, satellite networks, radio and television broadcast networks, optical networks, metro area networks (MANs), computer networks, grid networks, exchanges (e.g., private branch exchange (PBX)), broadband integrated data services network (B-ISDN), access networks, digital subscriber lines (DSL), cable, etc.

The communication devices 104 can include any device capable of transmitting or receiving voice and/or data, including but not limited to: telephones, smart phones, mobile phones, personal digital assistants (PDAs), computers, FAX machines, Internet-enable devices, media players, set-top boxes, email devices, etc. In some implementations, a communication device 104 can be an analog telephone adapter (ATA), such as the Cisco® ATA 186 manufactured by Cisco Systems Inc. (San Jose, Calif.).

In the example shown, a plain old telephone service (POTS) telephone 104b and a FAX machine 104c are coupled to the network 106 through gateways 108, 110, respectively. The gateways 108, 110, can be network nodes equipped for interfacing two or more networks that use different protocols. The gateways 108, 110, can contain devices such as protocol translators, impedance matching devices, rate converters, fault isolators, or signal translators as necessary to provide system interoperability. In the example shown, the gateways 108, 110, provide an interface between a conventional time-division multiplexed (TDM) telephone system and the Internet.

A PC telephone 104a is also shown coupled to the network 106 using network access technology (e.g., network interface card, Ethernet, DSL, cable modem, optical link, wireless transceiver). In some implementations, the PC telephone can be physically or wirelessly coupled to an Internet service provider (ISP), which provides access to the Internet.

In some implementations, the traffic routing management system 102 includes a security database 112, a signaling control 114, a billing database 116, a registrar 118, an access control interface 120 and a service database 122. In some implementations, the system 102 is a VoIP service provider. In other implementations, one or more of these components can be provided by other providers associated with the network 106.

In some implementations, the security database 112 can include information and code for establishing a secure communications channel (e.g., passwords, encryption/decryption code, secret keys, digital certificates). For example, the security database 112 can include code for implementing Secure Real-time Transport Protocol (SRTP). SRTP defines a profile of Real-time Transport Protocol (RTP), intended to provide encryption, message authentication and integrity, and replay protection to the RTP data in both unicast and multicast applications.

In some implementations, the signaling control 114 includes code for processing various signaling protocols, including Session Initiation Protocol (SIP), and making routing decisions. The signaling control 114 extracts signals from traffic and uses the information to perform various tasks, such as making routing decisions. For example, in a typical network environment where SIP is used to establish sessions between two or more entities, the signaling control 114 can detect T.38 capability by Session Description Protocol (SDP) entries in an initial session request message (e.g., SIP INVITE message). This may be through a particular codec type in the audio stream or through an independent media stream different from the voice audio media stream. After the initial INVITE, the signaling control 114 can establish a session as an ordinary audio voice call using RTP, with the ability to switch to T.38 mode. With dedicated fax machines the initial invite may set up a T.38 connection first, which can be handled by modifying a startup sequence to skip autodetection phases. At this point, either the detection of a fax tone in the local audio codec stream or the receipt of a network event such as a SIP RE-INVITE or receipt of a T.38 RTP packet will force a transition to T.38 mode.

The signaling control 114 communicates with the access control 120, which can be a switch, for example. The access control interface 120 can be configured by the signaling control 114 to direct traffic to destinations based on routing decisions generated by the signaling control 114. A customer's service information (e.g., call forwarding, quality of service, voicemail) stored in the service database 122 can be used in making routing decisions. The service database 122 can also be used to provision VoIP services automatically or on-demand. For example, subscribers can be provided access to multiple interfaces available for ordering services (e.g. web, Point of Sale (PoS) terminals, mobile interfaces, interactive voice response (IVR)), and their services can be enabled by the system 102 in realtime.

In some implementations, the registrar 118 can be a server that accepts REGISTER requests and places the information it receives in those requests into a location service for a domain the server handles. Registration can include sending a REGISTER request to a special type of User Agent Server (UAS) known as a registrar (e.g., an SIP user agent). In some implementations, the registrar 118 acts as the front end to the location service for the domain it handles, reading and writing mappings based on the contents of REGISTER requests. This location service can be consulted by a proxy server that is responsible for routing requests for that domain.

The billing database 116 stores billing information, such as billing records 124, which can be used for VoIP billing and service provisioning. The billing database can include Call Detail Records (CDRs) and FAX records, for example. The billing records 124 or CDRs can include a variety of information, including but not limited to: target and source numbers, the date, time and duration of a call, call rates, carrier information, traffic types (e.g., fax, modem, voice), traffic and network analysis reports, etc. In addition to billing records 124, the billing database 116 can also store information received with inband and out of band signaling (e.g., SIP signaling), and/or information generated by gateways, domain name servers, carrier equipment, other VoIP service providers, etc.

Figure 2A:
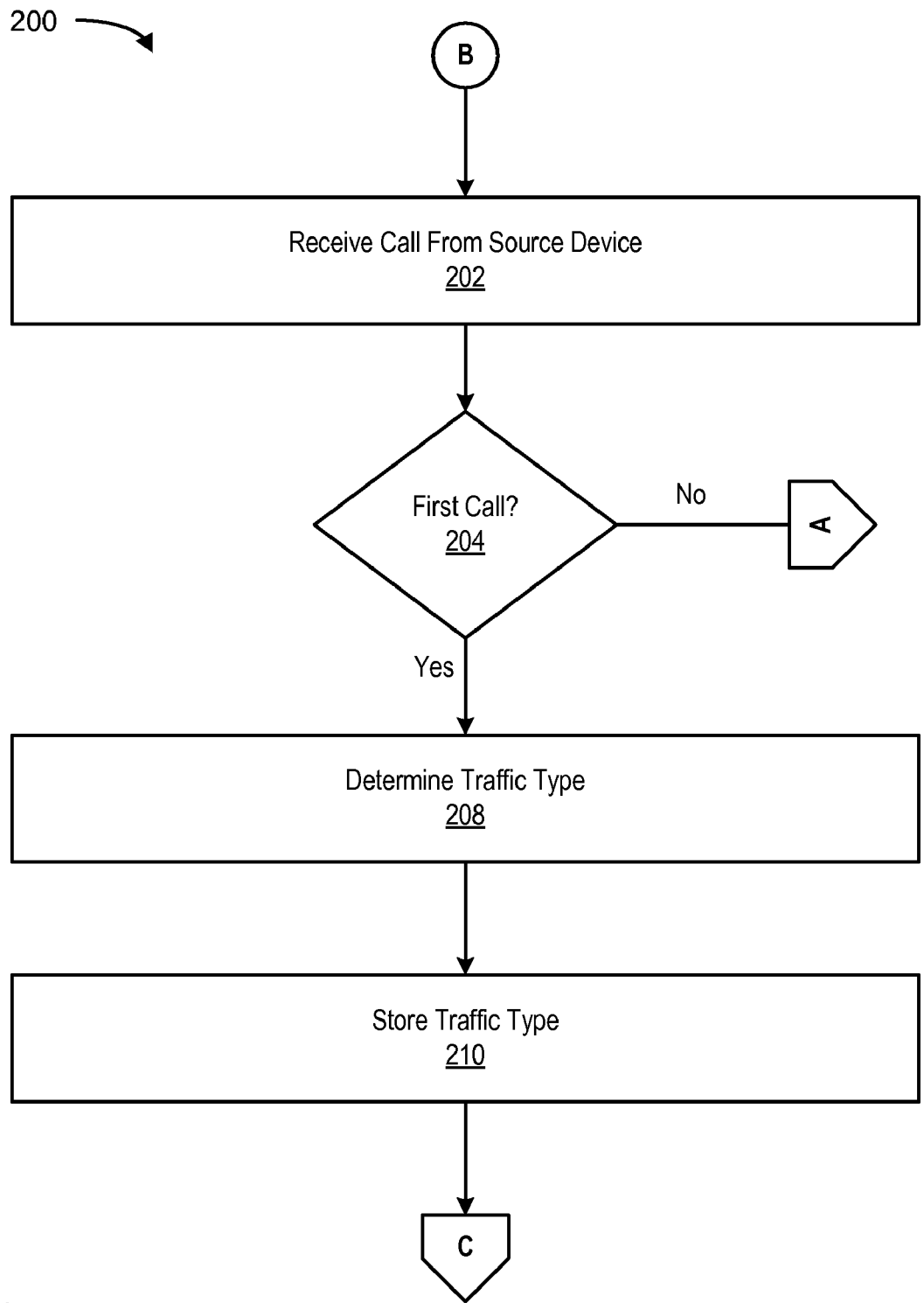
FIGS. 2A and 2B are flow diagrams of an example process for intelligent routing of voice and data traffic between source and target devices based on traffic type.
Figure 2B:
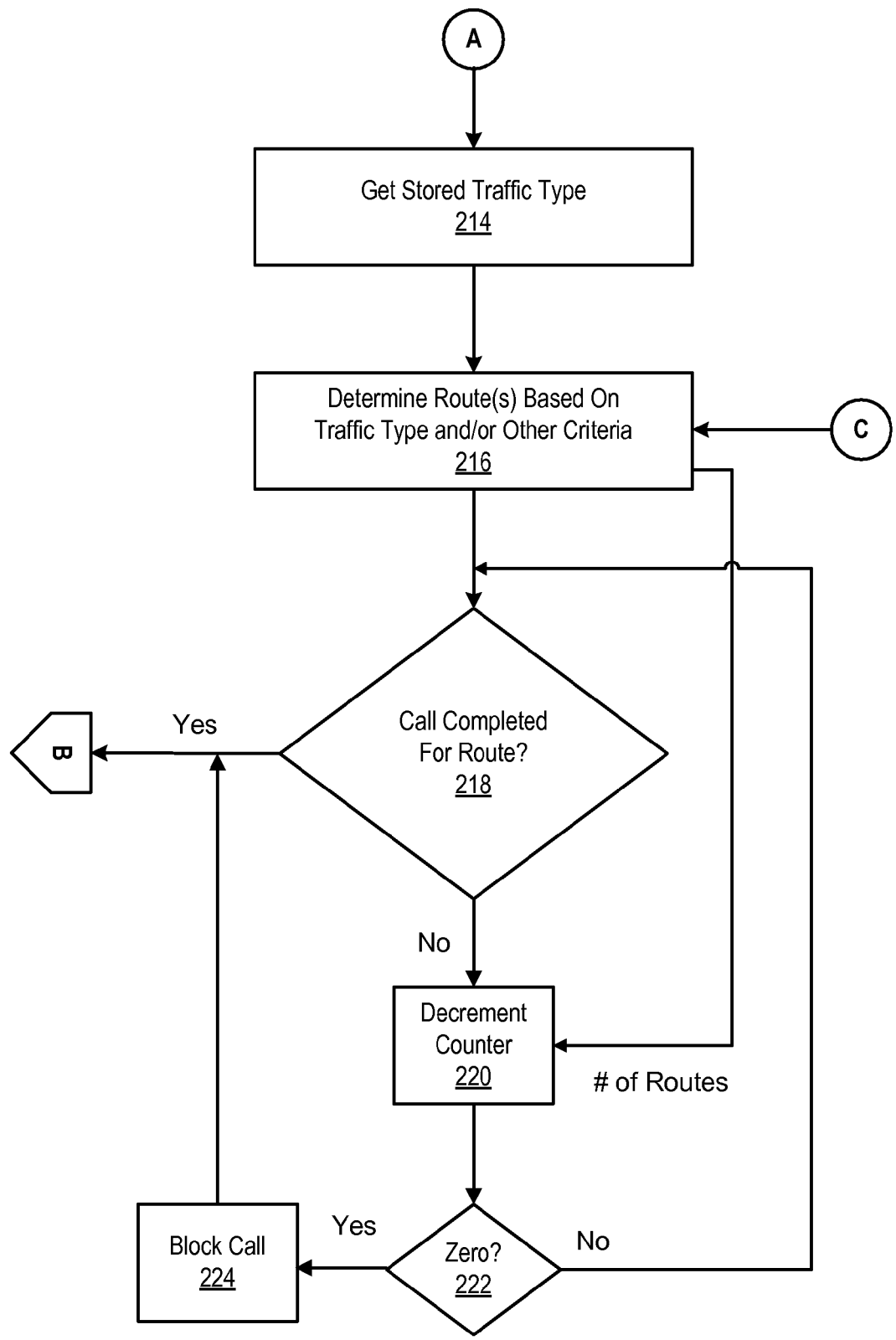

In some implementations, the signaling control 114 uses billing records 124 and/or other information stored in the billing database 116 to make routing decisions based on traffic type, as described in reference to FIGS. 2A and 2B.

Example Intelligent Call Routing Process

FIGS. 2A and 2B are flow diagrams of an example process 200 for intelligent routing of voice and data traffic. In some implementations, the process 200 begins when a call request is received from a source device (202) for a voice or data transmission to a target device. Source and target devices can be personal computers, FAX machines, hybrid devices, mobile phones, email devices, POTS telephones, Instant Messaging devices, PDAs, set-top boxes, servers, routers, gateways, hubs, exchanges, switches, ATAs or any other device capable of communicating voice or data. The term "call" as used herein refers to any attempt or request by a first or source device to connect with second or target device.

If the call request is a first request from the source device (204), then the traffic type is determined (208) and stored (210) in a repository. For example, the traffic type can be stored in a billing record 124 and/or CDR in a billing database 116 of system 102. A traffic type can be a FAX transmission, a modem transmission, a voice transmission or any other type of transmission that can be handled in a different or preferential manner from other transmissions. Traffic types can be determined from a external database or registry (e.g., do not call registry), inband call tones (e.g., FAX or modem tones), inband or out of band call signaling (e.g., SIP REINVITE to G.711 or T.38). Depending on the source and/or target devices, these determinations can be made in real time during the call, or after the call is completed by analyzing digital signal processing (DSP) or billing data, for example.

After the traffic type is stored, the process 200 transitions to step 216. The traffic type can then be used by a call routing algorithm to determine one or more routes for the call based on the traffic type and/or one or more criteria (216). For example, since a FAX transmission is handled differently from voice transmissions, the process 200 may select carriers that have fully implemented T.38 protocol, have lower rates for carrying FAX transmissions or can deliver a desired QoS.

In some implementations, the call routing algorithm can be H.323 compliant that provides call routing and administration for H.323 VoIP endpoints in a VoIP network, including gateways, IP phones, PC devices, FAX machines and any other communication device. In some implementations, the call routing algorithm can dynamically self configure a VoIP routing database and support static routing to provide connectivity to endpoints that are not part of the VoIP network. In some implementations, the call routing algorithm enables load balancing among multiple gateways, and provides for authentication/authorization of calls in the VoIP network. The call routing algorithm can dynamically self configure the VoIP network by collecting routing information during endpoint registration. A call routing database can be automatically constructed and shared among other providers in the VoIP network. New endpoints can be automatically added and configured into the VoIP network.

Once a route is determined the call is routed and monitored to determine if the call was successfully completed using the determined route (218). If the call was successfully completed, the process 200 returns to step 202 and waits for another call. If the call was not successfully completed, a counter can be decremented (220). The counter can be initially set equal to the number of routing solutions provided in step 216. The routing solutions can be ordered according to any desired criteria. For example, the route solutions can be ordered from best to worse based on QoS and/or cost. If the count reaches zero (222) (all routing solutions are exhausted), then the call can be blocked or other appropriate action can be taken (224). For example, the user can be prompted with options (e.g., pay more for speed, reliability). In other implementations, source and target devices can be probed for capabilities. Once the capabilities are known, the capabilities can be used by the call routing generator to generate new routes. If the count has not reached zero, the process 200 can try to connect the call using another route.

Referring again to FIG. 2A, if another call is received from the same source device (202) and destined for the same target device, the process 200 gets the traffic type from storage (214) and uses the previous computed routing solutions (or generates new routing solutions) to connect the call, as previously described.

Example System Architecture

Figure 3:
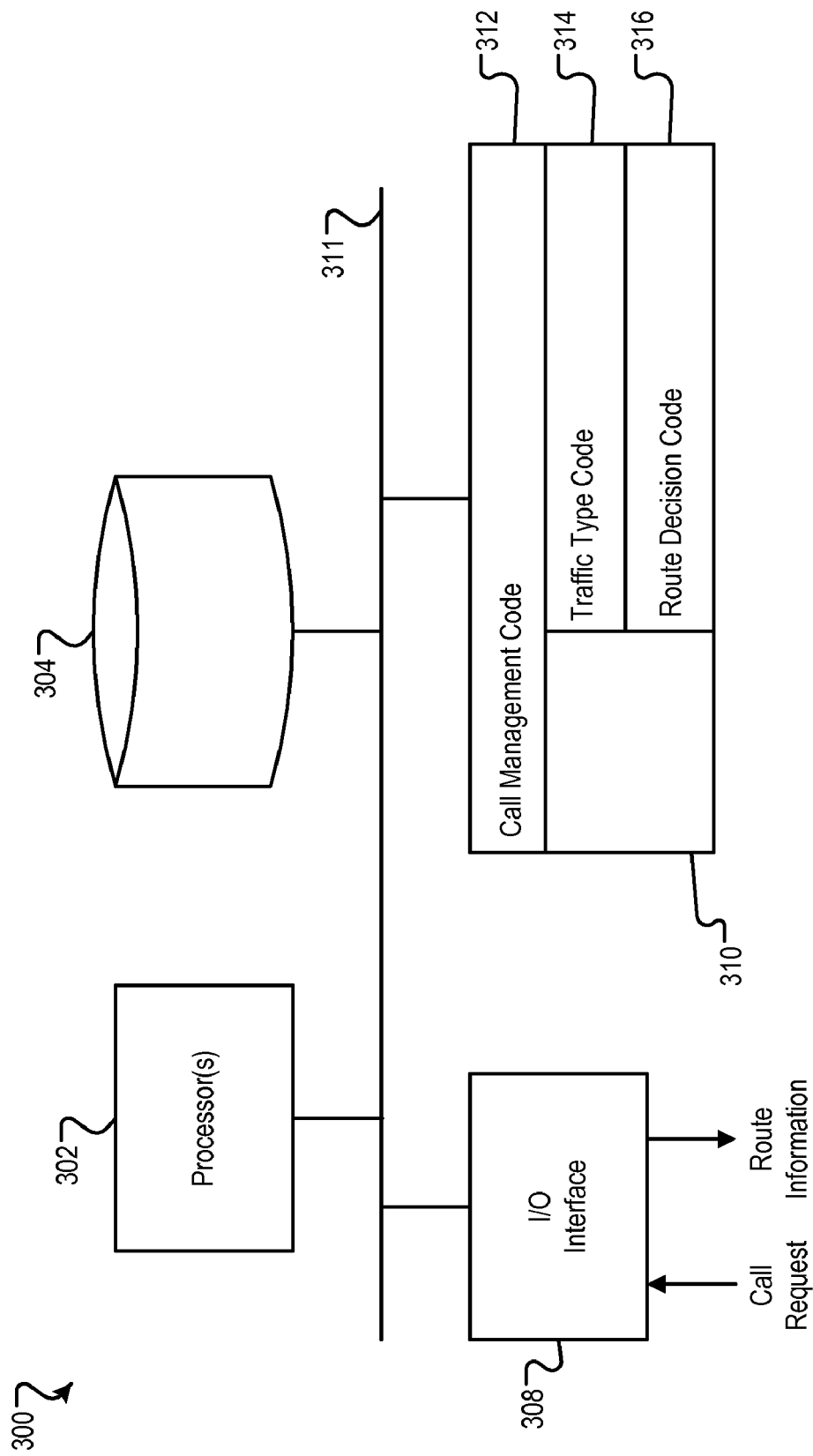
FIG. 3 is a block diagram of an example system architecture for performing the various operations described in reference to FIGS. 1-2.

FIG. 3 is a block diagram of an example system architecture 300 for performing the various operations described in reference to FIGS. 1-3. For example, the system 300 may be included in the signaling control 114, described in reference to FIG. 1. The system 300 includes one or more processors 302, a memory 310, a storage device 304, and an input/output interface 308. Each of these components can be interconnected using a system bus 311. The processor 302 is capable of processing instructions for execution within the system 300. In some implementations, the processor 302 is a single-threaded processor. In other implementations, the processor 302 is a multi-threaded processor. The processor 302 is capable of processing instructions stored in the memory 310 or on the storage device 304 to perform the operations described in reference to FIGS. 1-2.

In some implementations, the processor 302 is a DSP, which is capable of processing inband and/or out of band traffic signals to determine traffic types (e.g., FAX tone detection).

The memory 310 stores information within the system 300. In some implementations, the memory 310 is a computer-readable medium. In other implementations, the memory 310 is a volatile memory unit. In yet other implementations, the memory 310 is a non-volatile memory unit. In the example shown, the memory 310 includes call management code 312 for implementing the operations described in reference to FIGS. 1-2. In some implementations, the call management code 312 includes traffic type code 314 for determining traffic types (e.g., FAX tone detection, modem tone detection, dialtone detection) and route decision code 316 for determining route solutions.

The storage device 304 is capable of providing mass storage for the system 300. In some implementations, the storage device 304 is a computer-readable medium. In various different implementations, the storage device 304 may be a floppy disk device, a hard disk device, an optical disk device, or a tape device.

The input/output interface 308 provides an interface for input/output operations for the system 300. In some implementations, the input/output interface 308 can be coupled to a keyboard and/or pointing device. In other implementations, the input/output interface 308 can be coupled to a display unit for displaying graphical user interfaces. In the example shown, the interface 308 is coupled to the access control 120 for receiving call requests and for providing route information, as described in reference to FIGS. 1-2.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving traffic from a first device for transmission to a second device at least partially through a packet-switched data network, wherein the traffic comprises a communication session between the first device and the second device;
   determining a traffic type at least partially based on traffic previously transmitted by the first device for prior transmissions, wherein the traffic type comprises characteristics related to the traffic that establish handling of the traffic to the second device;
   determining at least one or more routes to the second device based on the determined traffic type, each determined route comprising a single path between the first device and the second device that is able to support the communication session between the first device and the second device;
   ordering the determined routes according to a desired criteria to establish the communication session;
   setting a counter equal to the number of determined routes to the second device;
   transmitting the traffic to the second device based on the route to establish the communication session; and
   decrementing the counter if the traffic was not successfully transmitted.

2. The method of claim 1, wherein traffic is a facsimile transmission.

3. The method of claim 1, wherein the first or second device is a computer or facsimile machine.

4. The method of claim 1, where the packet-switched data network is the Internet.

5. The method of claim 1, where determining a traffic type further comprises:
   determining a traffic type using an in band or out-of-band signal.

6. The method of claim 1, where determining a traffic type further comprises:
   obtaining the traffic type from a storage device.

7. The method of claim 6, where the traffic type is stored in a billing or call detail record.

8. The method of claim 1 further comprising:
   determining if the transmission was completed using the route; and
   if the transmission was not completed, attempting to transmit the traffic using a different route or blocking the traffic.

9. The method of claim 1, further comprising monitoring the traffic to determine if the traffic was successful transmitted.

10. A method comprising:
    receiving a call from a source device, wherein the call comprises a communication session from the source device to a target device;
    determining if the call is a first call, wherein the first call comprises a first communication from the source device;
    if the call is a first call, determining a traffic type from the first call, wherein the traffic type comprises characteristics related to the call that establish handling of the call to the target device;
    storing the traffic type for use with subsequent calls after the first call;
    determining one or more routes based on the traffic type, wherein the one or more routes each comprise a single path between the source device and the target device that is able to support the communication session between the source device and the target device;
    attempting to connect the call to the target device using the one or more routes;
    ordering the determined routes according to a desired criteria to establish the communication session;
    setting a counter equal to the number of determined routes to the second device; and
    decrementing the counter if the traffic was not successfully transmitted.

11. The method of claim 10, further comprising:
    determining if the call was completed using the route; and
    if the call was not completed, attempting to connect the call to the target device using a different route.

12. A system comprising:
    an interface configurable for obtaining traffic from a first device for transmission to a second device at least partially through a packet-switched data network, wherein the traffic comprises a communication session between the first device and the second device; and
    a signaling control module coupled to the interface and configurable for determining a traffic type at least partially based on traffic previously transmitted by the first device for prior transmissions, wherein the traffic type comprises characteristics related to the traffic that establish handling of the traffic to the second device, and for determining at least one or more routes to the second device based on the traffic determined type, each determined route comprising a single path between the first device and the second device that is able to support the communication session between the first device and the second device;
    ordering the determined routes according to a desired criteria to establish the communication session;
    setting a counter equal to the number of determined routes to the second device; and
    decrementing the counter if the traffic was not successfully transmitted.

13. The system of claim 12, wherein traffic is a facsimile transmission.

14. The system of claim 12, wherein the first or second device is a computer or facsimile machine.

15. The system of claim 12, where the packet-switched data network is the Internet.

16. The system of claim 12, where determining a traffic type further comprises:
    determining a traffic type using an in band or out-of-band signal.

17. The system of claim 12, where determining a traffic type further comprises:
    obtaining the traffic type from a storage device.

18. The system of claim 17, where the traffic type is stored in a billing or call detail record.

19. A non-transitory computer-readable medium having instructions stored thereon, which, when executed by a processor, causes the processor to perform operations comprising:

receiving traffic from a first device for transmission to a second device at least partially through a packet-switched data network, wherein the traffic comprises a communication session between the first device and the second device;

determining a traffic type at least partially based on traffic previously transmitted by the first device for prior transmissions, wherein the traffic type comprises characteristics related to the traffic that establish handling of the traffic to the second device;

determining at least one or more routes to the second device based on the determined traffic type, each determined route comprising a single path between the first device and the second device that is able to support the communication session between the first device and the second device;

transmitting the traffic to the second device based on the route to establish the communication session;

ordering the determined routes according to a desired criteria to establish the communication session;

setting a counter equal to the number of determined routes to the second device; and decrementing the counter if the traffic was not successfully transmitted.

20. A system comprising:

means for receiving traffic from a first device for transmission to a second device at least partially through a packet-switched data network, wherein the traffic comprises a communication session between the first device and the second device;

means for determining a traffic type at least partially based on traffic previously transmitted by the first device for prior transmissions, wherein the traffic type comprises characteristics related to the traffic that establish handling of the traffic to the second device;

means for determining at least one route to the second device based on the determined traffic type, each determined route comprising a single path between the first device and the second device that is able to support the communication session between the first device and the second device;

means for transmitting the traffic to the second device based on the route to establish the communication session;

means for ordering the determined routes according to a desired criteria to establish the communication session;

means for setting a counter equal to the number of determined routes to the second device;

decrementing the counter if the traffic was not successfully transmitted.

21. A method for routing traffic between a first device and a second device, the method comprising:

receiving traffic from the first device for transmission to the second device at least partially through a packet-switched data network, wherein the traffic comprises a communication session between the first device and the second device;

determining a traffic type, wherein the traffic type comprises characteristics related to the traffic that establish handling of the traffic to the second device;

determining routes to the second device based on the determined traffic type, wherein each of the routes comprises a single path between the first device and the second device that is able to support the communication session between the first device and the second device;

ordering the determined routes according to desired criteria to establish the communication session;

setting a counter equal to the number of determined routes to the second device;

transmitting the traffic to the second device via the most preferable determined route;

monitoring the traffic to determine if the traffic was successfully transmitted; and decrementing the counter if the traffic was not successfully transmitted.

22. The method of claim 21, further comprising:

transmitting the traffic to the second device via the next preferable determined route if the traffic was not successfully transmitted; and decrementing the counter if the traffic was not successfully transmitted.

23. The method of claim 22, further comprising:

if the counter reaches zero, blocking the traffic and/or providing a user of the first device with information relating to the transmission.

24. The method of claim 21, wherein the desired criteria comprises one or more of quality and cost.

25. A method for routing traffic between a first device and a second device, the method comprising:

receiving traffic from the first device for transmission to the second device, wherein the first device is part of a Voice over Internet Protocol (VoIP) network and the second device is not part of the VoIP network, wherein the first device and the second device are coupled to respective gateways to enable interfacing between the VoIP network and the network of the second device, wherein the traffic comprises a communication session between the first device and the second device;

determining a traffic type, wherein the traffic type comprises characteristics related to the traffic that establish handling of the traffic to the second device;

storing the traffic type in a registry associated with the first device;

determining routes to the second device based on the determined traffic type, wherein each of the routes comprises a single path between the first device and the second device that is able to support the communication session between the first device and the second device;

transmitting the traffic to the second device via static routing to enable transmission outside of the VoIP network between the first device gateway and the second device gateway to establish the communication session;

ordering the determined routes according to desired criteria to establish the communication session;

setting a counter equal to the number of determined routes to the second device; and decrementing the counter if the traffic was not successfully transmitted.

26. The method of claim 25, further comprising:

performing a load balancing operation among the first device gateway and the second device gateway.

27. The method of claim 25, further comprising:

storing routing information relating to the second device; and providing access to the second device routing information among other devices in the VoIP network for subsequent transmissions to the second device outside of the VoIP network.

* * * * *